United States Patent
Yamakawa

(10) Patent No.: US 8,014,008 B2
(45) Date of Patent: Sep. 6, 2011

(54) CONTROL APPARATUS, CONTROL METHOD THEREFOR, AND PRINTING SYSTEM

(75) Inventor: Junichi Yamakawa, Hiratsuka (JP)

(73) Assignee: Canon Kabushiki Kaisha, Tokyo (JP)

(*) Notice: Subject to any disclaimer, the term of this patent is extended or adjusted under 35 U.S.C. 154(b) by 1337 days.

(21) Appl. No.: 11/594,205

(22) Filed: Nov. 8, 2006

(65) Prior Publication Data

US 2007/0109587 A1    May 17, 2007

(30) Foreign Application Priority Data

Nov. 16, 2005  (JP) .................................. 2005-332059

(51) Int. Cl.
    G06K 15/00    (2006.01)

(52) U.S. Cl. ......... 358/1.14; 358/1.15; 358/1.1; 358/1.9
(58) Field of Classification Search .................. 358/1.15, 358/1.1, 1.9, 1.14
    See application file for complete search history.

(56) References Cited

U.S. PATENT DOCUMENTS

| | | | |
|---|---|---|---|
| 6,977,747 B1 | 12/2005 | Matsukubo et al. | |
| 2006/0090143 A1* | 4/2006 | Tanaka | 715/810 |
| 2006/0221380 A1* | 10/2006 | Pretz et al. | 358/1.15 |
| 2007/0109587 A1 | 5/2007 | Yamakawa | |

FOREIGN PATENT DOCUMENTS

JP    2005108113    4/2005

\* cited by examiner

*Primary Examiner* — King Y Poon
*Assistant Examiner* — Iriana Cruz
(74) *Attorney, Agent, or Firm* — Fitzpatrick, Cella, Harper & Scinto

(57) ABSTRACT

This invention allows setting which of user defining sheet name and print sheet name is to be used for each print sheet type when receiving a print sheet error notification from a network printer and notifying a client of a recovery request message. In order to implement a function not supported by a color copying apparatus, a control apparatus is interposed between a client terminal-connected network and the color copying apparatus. The control unit in the control apparatus receives a recovery request message from the color copying apparatus. In this case, the control unit refers to a user defining sheet database to determine which user defining sheet name and print sheet name is to be used as a sheet name contained in the recovery request message to be sent to a print job-issuing client terminal. The control unit transmits the determined recovery request message to the client terminal.

9 Claims, 14 Drawing Sheets

FIG. 4

| | |
|---|---|
| SHEET CASSETTE 334 | PLAIN PAPER |
| SHEET CASSETTE 335 | RECYCLED PAPER |
| MANUAL FEED TRAY 336 | THICK PAPER |

FIG. 5

| TYPE 51 | NAME 52 | GRAMMAGE (gsm) 53 | SURFACE PROPERTY 54 | PAPER GRAIN 55 | TRANSFER CURRENT REGULATION 56 | GLOSSINESS ADJUSTMENT 57 | SIZE |
|---|---|---|---|---|---|---|---|
| BASIC | PLAIN PAPER | 80gsm | PLAIN PAPER | LONG | - | - | A4 |
| BASIC | RECYCLED PAPER | 64gsm | RECYCLED PAPER | LONG | - | - | LTR |
| BASIC | THICK PAPER | 150gsm | PLAIN PAPER | LONG | - | - | A4 |
| EXTENDED | MOHAWK 150gsm | 150gsm | PLAIN PAPER | LONG | - | - | |
| EXTENDED | HAMMERMILL | 105gsm | PLAIN PAPER | LONG | - | - | |
| EXTENDED | HQ COATED PAPER | 200gsm | DOUBLE-SIDED COATED | LONG | - | - | |
| CUSTOM | CUSTOM 1 | 200gsm | FILM | LONG | +3 | 0 | |
| CUSTOM | CUSTOM 2 | 180gsm | HIGH GRADE | LONG | -12 | -10 | |

| USER DEFINING SHEET NAME | PRINT SHEET NAME | COLOR PROFILE | NOTIFICATION NAME | SIZE |
|---|---|---|---|---|
| 61 | 62 | 63 | 64 | 65 |
| A4 "FOR INTERNAL USE ONLY" PAPER | RECYCLED PAPER | C001 | USE USER DEFINING SHEET NAME | LTR |
| A4 PLAIN PAPER | PLAIN PAPER | C015 | USE PRINT SHEET NAME | A4 |
| THICK PLAIN PAPER | THICK PAPER | — | USE PRINT SHEET NAME | A4 |
| ...... | ...... | | | |

FIG. 7

- USER DEFINING SHEET NAME [_____] ~71
- COLOR PROFILE [_____▼] ~72
- UPLOAD COLOR PROFILE [ UPLOAD ] ~73

~74
- PRINT SHEET NAME [_____]
- SHEET SIZE [_____]
- GRAMMAGE (gsm) [_____]
- SURFACE PROPERTY [_____]

SEARCH FOR PRINT SHEET UNDER ABOVE CONDITIONS. [ SEARCH ] ~75

[_____] ~76

☐ USE PRINT SHEET NAME AS USER DEFINING SHEET NAME. ~77

☐ USE PRINT SHEET NAME IN RECOVERY. ~78

[ CANCEL ]  [ OK ] ~79

FIG. 10A

A4 "FOR INTERNAL USE ONLY
" SHEETS RUN SHORT.
PLEASE LOAD SHEETS.

"THICK PAPER" SHEETS RUN SHORT.
PLEASE LOAD SHEETS.

| | | |
|---|---|---|
| USER DEFINING SHEET NAME | [_____] | ~71 |
| COLOR PROFILE | [_____▼] | ~72 |
| UPLOAD COLOR PROFILE | [ UPLOAD ] | ~73 |
| SHEET TRAY | [ CASSETTE 1 ▼] | ~1400 |

~74

- PRINT SHEET NAME [_____]
- SHEET SIZE [_____]
- GRAMMAGE (gsm) [_____]
- SURFACE PROPERTY [_____]

~75

SEARCH FOR PRINT SHEET UNDER ABOVE CONDITIONS.    [ SEARCH ]

[_____] ~76

☐ USE PRINT SHEET NAME AS USER DEFINING SHEET NAME. ~77

☐ USE PRINT SHEET NAME IN RECOVERY. ~78

[ CANCEL ]    [ OK ] ~79

CONTROL APPARATUS, CONTROL METHOD THEREFOR, AND PRINTING SYSTEM

BACKGROUND OF THE INVENTION

1. Field of the Invention

The present invention relates to a control apparatus connected to an image forming apparatus.

2. Description of the Related Art

There is known a network-connectable digital multifunctional peripheral machine (MFP) having a plurality of sheet feed cassettes storing a plurality of types of print sheets and having copy, printer, and facsimile functions. Some apparatuses of this type have various functions such as a document black/white reversal (negative/positive reversal) process, a trimming process to copy only part of a document, and a reduction layout process to print by reducing and compositing a plurality of documents on one print sheet.

A printer engine installed in the digital copying machine optimizes image forming conditions associated with printing for each print sheet type. In general, print sheet types are roughly classified into glossy paper, plain paper, thick paper, and transparent sheet. Even plain paper differs in grammage (weight per unit area) between manufacturers. A user sometimes uses special watermark-bearing sheets or sheets of a special color. Strictly speaking, there are many types of print sheets, and there are numerous image forming conditions depending on the number of print sheet types.

To optimize image formation, a digital copying machine manufacturer stores a print sheet DB including each print sheet manufacturer name in the memory of the digital copying machine. A user operates the operation panel of the digital copying machine, refers to the print sheet DB, and associates a print sheet type with a sheet feed cassette.

To print a desired document or image, the user of a client PC on the network selects the type of print sheets stored in the digital multifunctional peripheral and executes a printing process to print the document or image on the target print sheet.

Recently, demand has increased for an advanced image process to the printing function of the digital copying machine. Color appearance is one of the demands. This demand can generally be met by setting a color profile in the digital copying machine, and setting, in print data, command information representing the use of the color profile and command information designating the type of print sheet used for the color profile. However, some digital copying machines do not have a printing function using the color profile. The color profile is an ICC profile defined by the ICC (International Color Consortium).

To meet the above demands, there is known a technique of interposing, between a printing apparatus and a network, an independent control apparatus for executing functions not supported by the printing apparatus (e.g., Japanese Patent Laid-Open No. 2005-108113). That is, the control apparatus sets a color profile in accordance with a request from a user, uses the color profile to perform an image process for print data received from the network, and outputs print bitmap image data to the digital copying machine. The printer engine of the digital copying machine simply forms an image from the received bitmap data, satisfying the user request.

A client terminal on the network recognizes the control apparatus as a printer. The client terminal can instruct the control apparatus as to the color profile and print sheet type to set.

In many cases, one organization such as a company uses print sheets from a fixed manufacturer. As far as that manufacturer is concerned, "plain sheet" means "A4 long-grain alkaline sheet available from company xxx". When a user designates printing from his client terminal, he may be confused if he has to designate "A4 long-grain alkaline sheet available from company xxx" or the like in selecting a print sheet. It is desirable if one can simply designate the intended sheet type by the phrase "A4 plain sheet".

To meet this user need, the control apparatus desirably incorporates a print sheet DB, similar to the digital copying machine.

In this case, however, consistency between a print sheet DB held in the printing apparatus such as the digital copying machine and that held in the control apparatus is important.

For example, the client terminal refers to the DB of the control apparatus, designates "A4 plain sheet", and prints while the digital copying machine is printing using the target print sheet "A4 long-grain alkaline sheet available from company xxx" and print sheets run short. If the print sheet run short, the operation panel of the digital copying machine displays a message that prompts the user to load "A4 long-grain alkaline sheets available from company xxx". In some cases, it is desirable to transmit the same message to the client terminal and display it. In other cases, it is desirable to transmit the message "A4 plain sheets run short." to the client terminal and display it. In the former case, the user of the print job-issuing client terminal loads print sheets in the digital copying machine. In the latter, the user of the print job-issuing client terminal contacts a person who loads print sheets in the digital copying machine.

A preprinted sheet prepared by printing a logotype on an A4-size plain sheet is sometimes registered with the user defining sheet name "logo-bearing sheet". In this case, when sheets run short and "A4 sheets run short." is displayed as the print sheet name, the user cannot determine whether A4 plain sheets or A4 preprinted sheets should be loaded. In this case, it is convenient if one can display a user defining sheet name and prompt the user to load target sheets when sheets run short.

In some cases, however, displaying a user defining sheet name after print sheets run short is confusing. For example, consider a situation in which a color profile for company A is set for sheet A, and "company A" is registered as a user defining sheet name. Further, a color profile for company B is set for the same sheet A, and "company B" is registered as a user defining sheet name. In this case, even if "sheets available from company A run short." or "sheets available from company B run short." is displayed after sheets run short, the user cannot determine what kind of sheets are to be loaded.

As described above, when a control apparatus is interposed between a network and an image forming apparatus such as a digital copying machine, an error message sent to a client terminal desirably complies with the user operation environment.

SUMMARY OF THE INVENTION

The present invention has been made in consideration of the above situation, and has as its object to provide a technique capable of generating a message complying with user settings when a control apparatus for extending the functions of a printing apparatus such as a digital copying machine is interposed between the printing apparatus and a network.

In order to solve the above problems, for example, a control apparatus according to the present invention comprises the following arrangement.

That is, a control apparatus connected to an image forming apparatus comprises registering means for registering a user defining sheet name in correspondence with a sheet having a print sheet name registered in the image forming apparatus, designation means for designating which of the print sheet name and user defining sheet name is to be displayed during recovery, and output means for outputting a message containing the print sheet name or the user defining sheet name on the basis of designation by the designation means during recovery.

According to another aspect of the present invention, a control apparatus which extends the function of an image forming apparatus comprises first communication means for communicating with a network connected to a client terminal which issues a print job, second communication means for communicating with the image forming apparatus, image processing means for generating output image data on the basis of extended-function designation information described in the print job received by the first communication means, output means for outputting the generated output image data to the image forming apparatus via the second communication means, storage means for storing a user defining sheet database which stores, for each print medium type printable by the image forming apparatus, user defining sheet name information independent of a print sheet name in a database of the image forming apparatus, and information representing which of print sheet name information in a message and user defining sheet name information is to be used when receiving a print medium recovery request message from the image forming apparatus, and output means for, upon receiving the recovery request message via the second communication means, referring to the storage means to determine which of user defining sheet name information and print sheet name information is to be used, regenerating the recovery request message, and outputting the regenerated recovery request message.

The present invention allows setting which of user defining sheet name and print sheet name is to be used for each print sheet type when sending a recovery request message.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a table showing an example of the correspondence table of sheet cassettes and print sheets set in the color copying apparatus in the embodiment;

FIG. 5 is a table showing the structure of a print sheet database stored in the color copying apparatus in the embodiment;

FIG. 7 is a view showing an example of a GUI for registering user defining sheet data;

FIGS. 10A and 10B are views showing examples of a recovery message displayed on the client terminal;

FIG. 14 is a view showing an example of a GUI for registering user defining sheet data in the second embodiment.

DESCRIPTION OF THE EMBODIMENTS

Preferred embodiments according to the present invention will be described in detail below with reference to the accompanying drawings.

Figure 2:
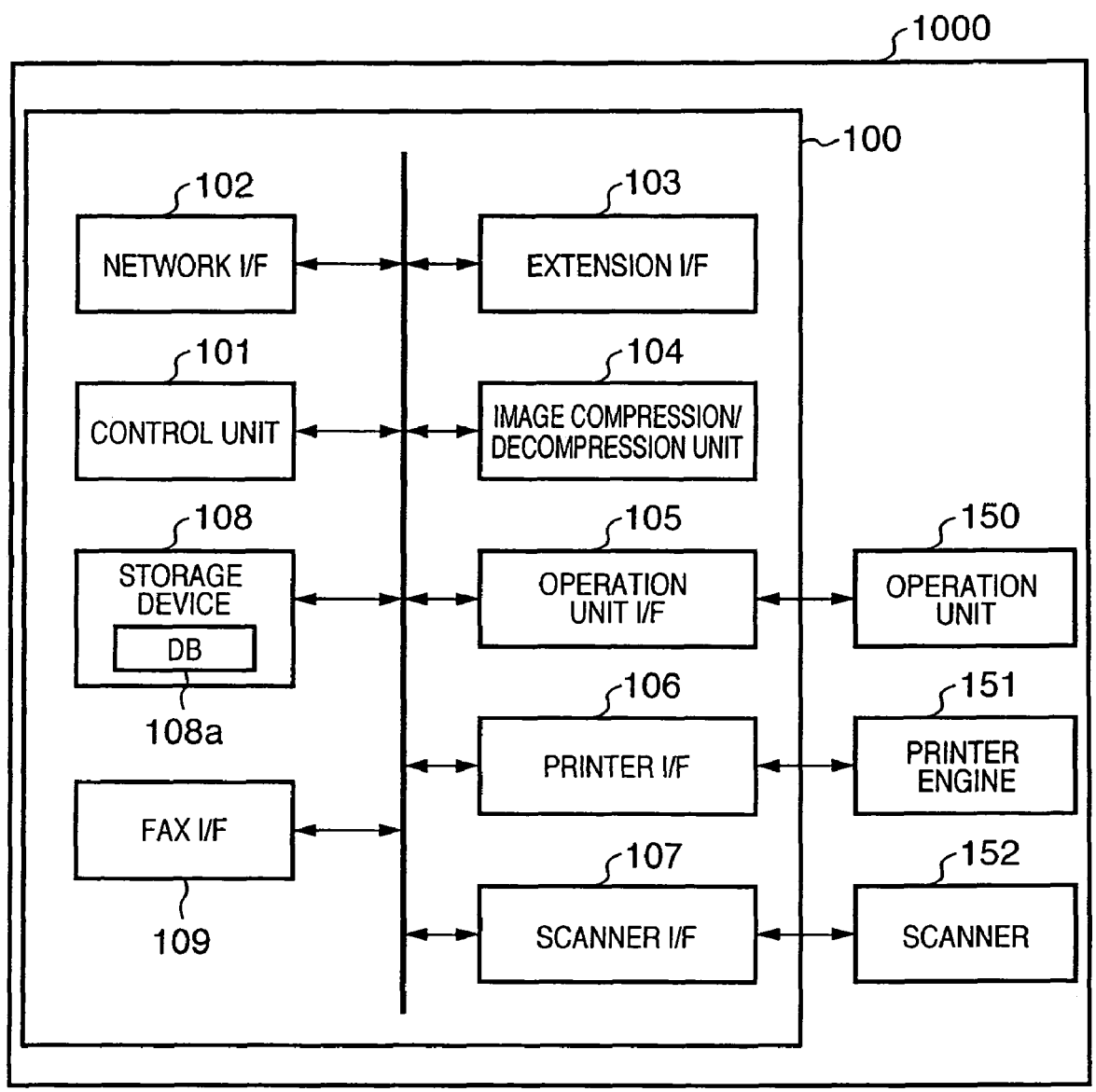
FIG. 2 is a block diagram of a color copying apparatus in the embodiment.

The embodiments will explain a case of adopting a full-color digital multifunctional peripheral machine (to be simply referred to as a color copying apparatus hereinafter) as an image forming apparatus. FIG. 2 is a block diagram of the color copying apparatus in the embodiment.

Referring to FIG. 2, reference numeral 1000 denotes a color copying apparatus in the embodiment having the following arrangement.

Referring to FIG. 2, reference numeral 100 denotes a device controller mounted as a printed board in the color copying apparatus 1000. Reference numeral 150 denotes an operation unit made up of various switch buttons, a liquid crystal display, and the like. Reference numeral 151 denotes a printer engine made up of four exposure units for printing in four, Y (yellow), M (magenta), C (cyan), and K (black) colors. Reference numeral 152 denotes a scanner which optically scans a document and captures it as image data.

The device controller 100 comprises a control unit 101 which controls the overall apparatus. The control unit 101 has a CPU, a ROM which stores process procedures (programs), and a RAM used as a work area. Reference numeral 102 denotes a network interface for connecting the apparatus to a network. Reference numeral 103 denotes an extension interface for communicating data with an external apparatus at high speed. Reference numeral 104 denotes an image compression/decompression unit which compresses bitmap data generated from PDL data by the control unit 101, and decompresses compressed data into bitmap data. Reference numeral 105 denotes an operation unit interface for connecting the operation unit 150. The operation unit interface 105 notifies the control unit 101 of various switch states input from the operation unit 150, and transmits information to be displayed on the liquid crystal display of the operation unit 150. Reference numeral 106 denotes a printer engine; interface which transfers print image data to the printer engine 151 and notifies the control unit 101 of status signals (e.g., sensor signals representing the presence/absence of print sheets, generation of a jam, and the like) set in the printer engine 151. Reference numeral 107 denotes a scanner interface which transmits designation information such as the start of scanning to the scanner 152 under the control of the control unit 101, and receives image data scanned by the scanner 152. Reference numeral 108 denotes a storage device such as a hard disk which stores a print sheet DB (database) 108*a*. The image compression/decompression unit 104 compression-codes bitmap image data expanded on the basis of a received print job. The storage device 108 stores the compressed data, too. Reference numeral 109 denotes a FAX interface which incorporates a modem for FAX transmission/reception.

Figure 3:
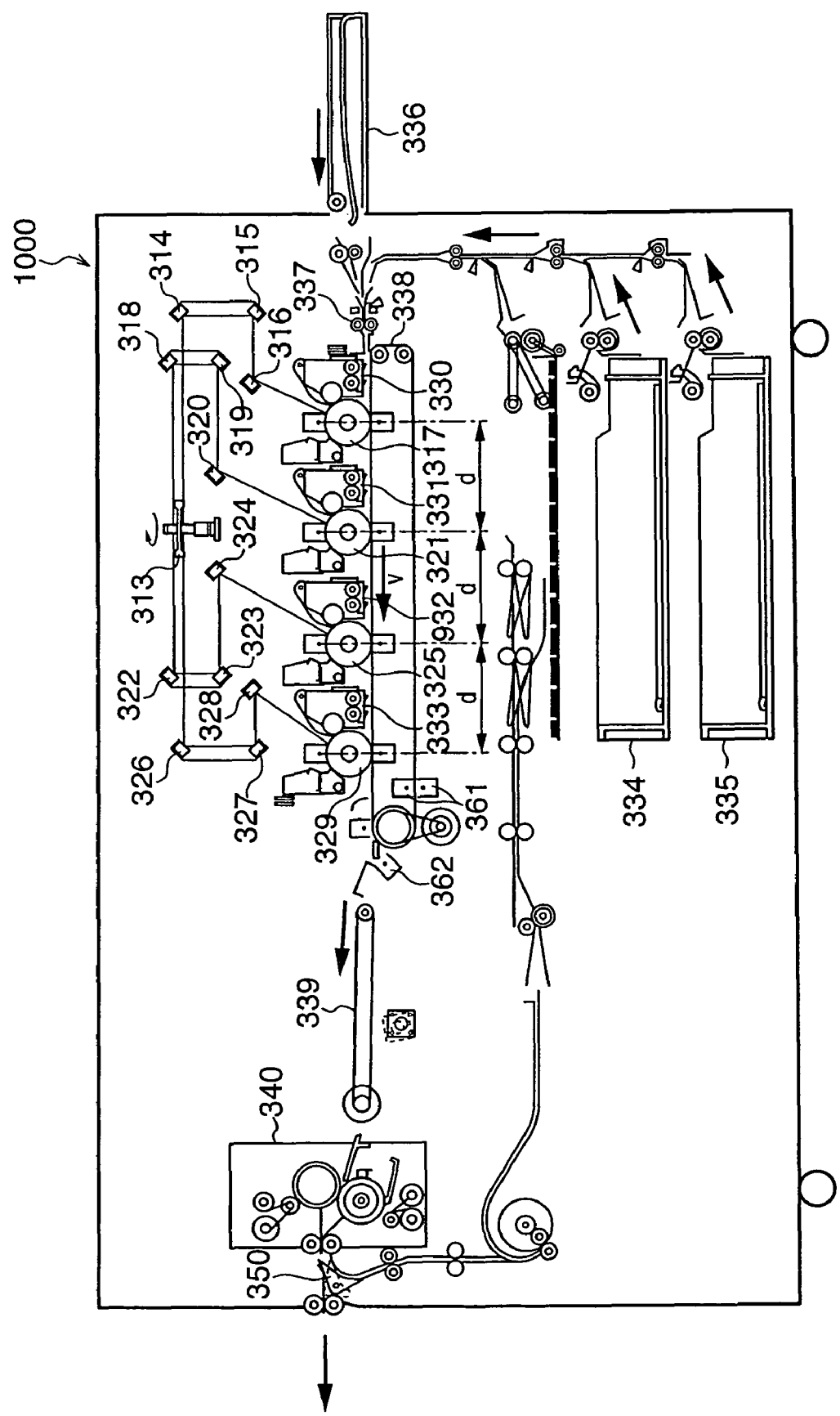
FIG. 3 is a sectional view of the structure of the printer engine part of the color copying apparatus in the embodiment.

FIG. 3 is a sectional view of the structure of the printer engine part of the color copying apparatus 1000 according to the embodiment.

In FIG. 3, reference numeral 313 denotes a polygon mirror which receives four laser beams emitted from four semiconductor lasers. One of the four semiconductor laser beams scans and exposes a photosensitive drum 317 via mirrors 314, 315, and 316. The second semiconductor laser beam scans and exposes a photosensitive drum 321 via mirrors 318, 319, and 320. The third semiconductor laser beam scans and exposes a photosensitive drum 325 via mirrors 322, 323, and 324. The fourth semiconductor laser beam scans and exposes a photosensitive drum 329 via mirrors 326, 327, and 328.

Reference numeral 330 denotes a developer which supplies yellow (Y) toner and forms a yellow toner image on the photosensitive drum 317 in accordance with a laser beam. Reference numeral 331 denotes a developer which supplies magenta (M) toner and forms a magenta toner image on the photosensitive drum 321 in accordance with a laser beam. Reference numeral 332 denotes a developer which supplies cyan (C) toner and forms a cyan toner image on the photosensitive drum 325 in accordance with a laser beam. Reference numeral 333 denotes a developer which supplies black (K) toner and forms a black toner image on the photosensitive drum 329 in accordance with a laser beam. Toner images of the four colors (Y, M, C, and K) are transferred onto a conveyed print medium (print sheet), obtaining a full-color output image.

A print medium is fed from one of sheet cassettes 334 and 335 and a manual feed tray 336. The print medium passes through registration rollers 337, is held on a transfer belt 338, and conveyed. The respective color toners are applied to the photosensitive drums 317, 321, 325, and 329 in synchronism with the sheet feed timing, and transferred onto the sheet upon conveyance of the sheet. A convey belt 339 conveys the sheet bearing the respective color toners, and a fixing unit 340 fixes the toners to the sheet. A flapper 350 temporarily guides down the sheet having passed through the fixing unit 340. After the trailing edge of the sheet passes through the flapper 350, the flapper 350 switches back to discharge the sheet. The sheet is discharged while facing down, and sheets are sorted in a correct page order after printing sequentially from the start page.

The four photosensitive drums 317, 321, 325, and 329 are at equal intervals of the distance d. The convey belt 339 conveys a sheet at a predetermined speed v. The four semiconductor lasers are driven in synchronism with the convey timing.

In the above arrangement, when receiving a print job described in PDL (Page Description Language) from a client PC, the control unit 101 interprets the received print job to expand it into bitmap image data of respective pages. The image compression/decompression unit 104 sequentially compression-codes the bitmap image data of respective pages, and the storage device 108 stores the compression-coded data. The control unit 101 sequentially reads out the compression-coded data stored in the storage device 108, decompresses (decodes) them, and transfers bitmap data of respective color components to the printer engine 151 at a predetermined timing. The printer engine 151 executes scanning exposure based on the bitmap data of the respective color components to form an image on a print sheet and discharge the print sheet outside the color copying apparatus 1000.

A print sheet for use is fed from one of the manual feed tray 336 and the sheet cassettes 334 and 335 which store print sheets designated by a received print job. Print sheet types must be set in advance for the sheet cassettes 334 and 335 and the manual feed tray 336.

FIG. 5 shows an example of the structure of the print sheet DB 108*a* stored in the storage device 108. As shown in FIG. 5, one line of the print sheet database represents information on one print sheet, and has several fields 51 to 57. The field 51 stores rough print sheet type information. The color copying apparatus manufacturer registers information on "basic" and "extended" in the manufacture. A user can arbitrarily set and register information on "custom". The field 52 stores the name (to be referred to as a print sheet name hereinafter) of the print sheet. The field 56 stores grammage information representing the weight per unit area. The field 54 stores surface specifying information, and the field 55 stores print sheet roll characteristic information. The field 56 stores correction amount information corresponding to a default current supplied to the transfer device for transferring a toner image to a print sheet by the printer engine 151. The field 57 stores information representing the degree of glossiness of the print sheet surface. If necessary, the administrator can register information on a new print sheet in the DB 108*a*. The administrator registers information by operating the operation unit 150.

In the embodiment, there are three sheet feed sources: the sheet cassettes 334 and 335 and the manual feed tray 336. The administrator sets and registers correspondence between the three sheet feed sources and print sheets in the print sheet DB 108*a*. The administrator sets the correspondence by operating the operation unit 150. FIG. 4 shows the correspondence table of sheet feed sources and print sheets that is held in the storage device 108.

When a print job received from the network describes the use of a plain sheet as a print sheet, the sheet cassette 334 is selected in accordance with the example of FIG. 4. That is, a print sheet conveyed from the sheet cassette 334 undergoes a printing process under conditions set in the field 56 and the like.

The color copying apparatus 1000 in the embodiment has been described. Assume that the color copying apparatus 1000 does not have an image forming function using a color profile, and a user demands advanced printing using the color profile.

Figure 1:
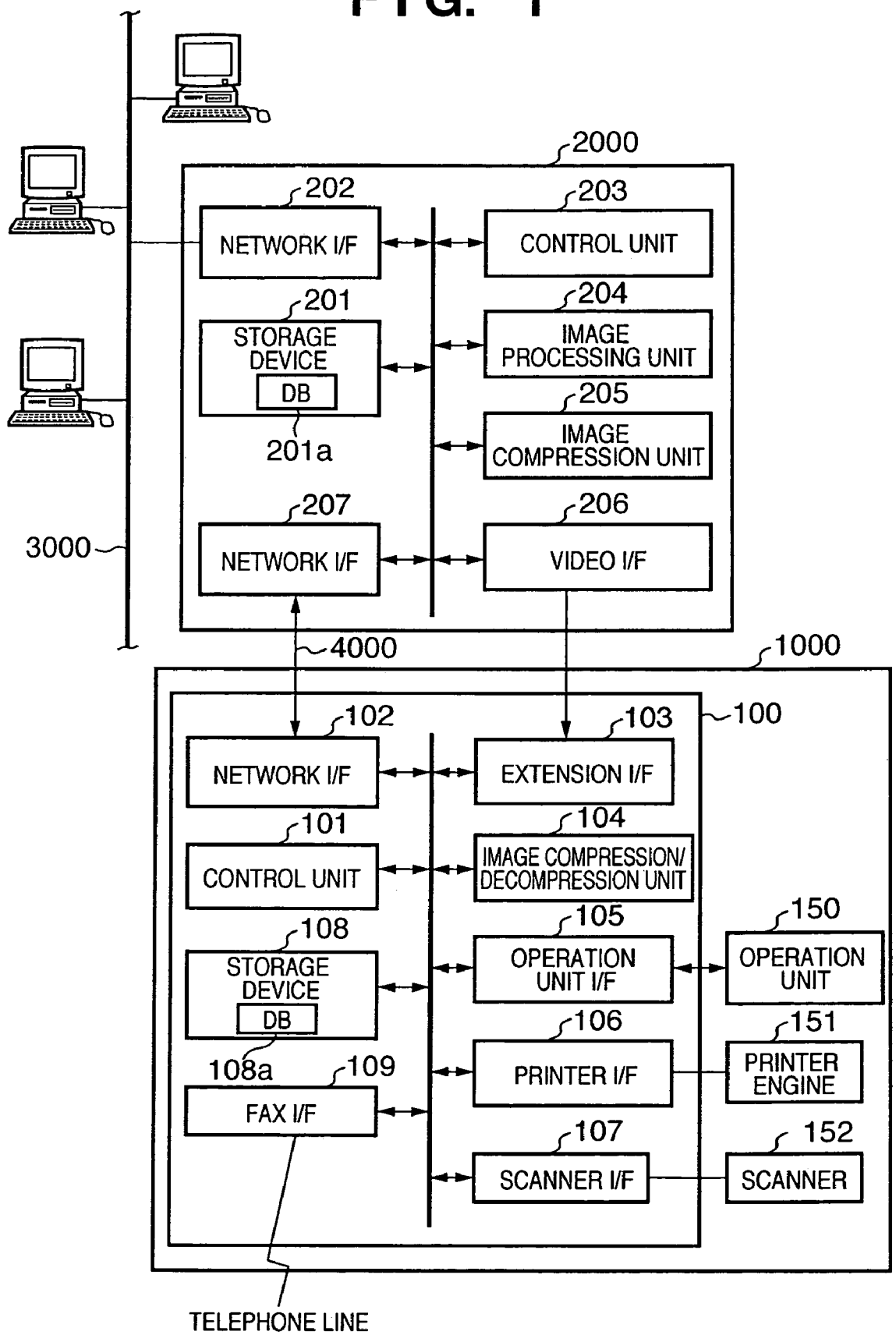
FIG. 1 is a block diagram of a printing system in an embodiment.

To meet this demand, as shown in FIG. 1, an independent control apparatus 2000 is interposed between the network and the color copying apparatus 1000.

The control apparatus 2000 has two network interfaces 202 and 207. The network interface 202 connects a network 3000 connected to client terminals. The network interface 207 connects the color copying apparatus 1000. The control apparatus 2000 has a function of generating a bitmap image in accordance with a color profile, which will be described later. Bitmap data has a large information amount, and is desirably transferred to the color copying apparatus at high speed. For high-speed transfer, the control apparatus 2000 comprises a video interface 206, as shown in FIG. 1. The video interface 206 connects to the extension interface 103 of the color copying apparatus 1000. With this configuration, a network 4000 which connects the control apparatus 2000 and color copying apparatus 1000 is used to transmit/receive mainly status information and various types of designation information. Since bitmap data has a large information amount, as described above, the control apparatus 2000 comprises an image compression unit 205. The image compression unit 205 has the same compression algorithm as that of the image compression/decompression unit 104 of the color copying apparatus 1000.

The control apparatus 2000 generates a bitmap image from PDL data in accordance with the color profile, as described above, and comprises an image processing unit 204 for this process. The control apparatus 2000 comprises a storage device 201 for storing various color profiles and a database 201a associated with print sheets. This database will be referred to as the user defining sheet DB 201a (it should be noted that the database of the color copying apparatus 1000 is a "print sheet DB").

Figure 6:
FIG. 6 is a table showing the structure of a user defining sheet database stored in a control apparatus in the embodiment.

The user defining sheet DB 201a in the storage device 201 of the control apparatus 2000 has a structure shown in FIG. 6.

A field 61 stores name information on a print sheet for use (this name will be referred to as a user defining sheet name hereinafter) in the control apparatus 2000. A user sets a user defining sheet name from a predetermined client terminal. More specifically, an administrator logs in from the client terminal with administrator authority and sets a user defining sheet name, details of which will be described later. A field 62 stores a print sheet name (field 52 in FIG. 5) registered in the color copying apparatus 1000. A field 63 is an area for specifying a color profile for use in an image process, and "–" means that no color profile is used. A field 64 stores notification name designation information. The notification name designation information defines which of names in the field 61 (user defining sheet name) and the field 62 (print sheet name) is to be used to send a message upon reception of an error (error such as the absence of print sheets or a jam) from the color copying apparatus 1000. A field 65 stores print sheet size information.

The administrator registers data in the user defining sheet DB 201a of the control apparatus 2000 by executing a setting/registration application on his client terminal, as described above.

FIG. 7 shows the GUI of the application. The administrator logs in to the control apparatus 2000 with administrator authority by inputting an administrator ID and password. The login method is known, and a description thereof will be omitted.

If the administrator activates the user defining sheet setting application on the client terminal and successfully logs in, a GUI window 70 in FIG. 7 appears. The administrator designates a target column with the keyboard and pointing device of the client terminal, and inputs a character string or figure, as needed.

Referring to FIG. 7, reference numeral 71 denotes a column for inputting a user defining sheet name and allowing the administrator to freely set a name. Reference numeral 72 denotes a combo box for selecting a color profile. The administrator clicks a triangular mark at the right end of the combo box 72 with the pointing device, displaying a pull-down list of color profiles registered in advance in the storage device 201 of the control apparatus 2000. The administrator selects one color profile from the list. When no color profile is used, the combo box 72 is blank.

When the administrator creates a new color profile on the client terminal or acquires it from the outside, he can also upload the color profile to the control apparatus 2000 and register it in the storage device 201. To upload the color profile, the administrator clicks a button 73. In response to clicking of the button 73, a dialog box for searching a file stored in the local hard disk of the client terminal or the like appears. The administrator can select a target color profile through the dialog box. The selected color profile is transmitted to the control apparatus 2000 by a predetermined protocol (e.g., FTP), and stored in a folder for storing a color profile in the storage device 201. To use a new color profile, the administrator can upload it, and operate the combo box 72.

Reference numeral 74 denotes an area for setting various parameters associated with a print sheet. The area 74 displays setting items such as a print sheet name, sheet size, grammage, and surface property so as to scroll them, as shown in FIG. 7. Inputs to the respective items in the area 74 are basically indispensable, but the administrator need not know all the setting items. To reduce the burden on the administrator, the embodiment provides a search button 75 and area 76 shown in FIG. 7.

The administrator inputs information on items to the area 74 as far as he knows, and clicks the search button 75. The application program transmits the item information input in the area 74 and a search request command to the control apparatus 2000. Upon reception of this request, a control unit 203 of the control apparatus 2000 transmits a request for information on a print sheet to the color copying apparatus 1000 via the network interface 207, similar to a general client terminal. The control unit 101 of the color copying apparatus 1000 transmits all data in the print sheet DB 108a stored in the storage device 108 to the control apparatus 2000. The control apparatus 2000 searches the information from the color copying apparatus for printing information which matches items set in the client terminal. Then, the control apparatus 2000 transmits the search result to the client terminal.

The application of the client terminal displays information on print sheets matching the input items in the area 76 such that the administrator can select a desired print sheet. The administrator selects information on a desired print sheet from the area 76, and can set information in noninput items in the area 74.

A check box 77 sets whether to set the user defining sheet name (name input to the column 71) to the same name as the print sheet name. If the administrator checks the check box 77, the name in the user defining sheet name column 71 is replaced with the found print sheet name. By checking this check box, the print sheet name held in the color copying apparatus 1000 coincides with the user defining sheet name held in the control apparatus 2000. In other words, when the administrator checks the column 71 to register the name, the fields 61 and 62 in FIG. 6 store the same sheet name.

A check box 78 sets a recovery method when the color copying apparatus 1000 needs to be recovered from the absence of print sheets, a jam, or the like. That is, the check box 78 sets whether to transmit a message using a print sheet name to the client terminal or a message using a user defining sheet name. When the check box 78 is checked, the recovery message uses a print sheet name stored in the field 62 of FIG. 6. When the check box 78 is not checked, the recovery message to a client terminal which has issued a current print job uses a user defining sheet name (data in the field 61).

To register the current setting contents, the administrator clicks the OK button. As a result, the set information is added and registered in the database of the storage device 201 in the control apparatus 2000.

Figure 8:
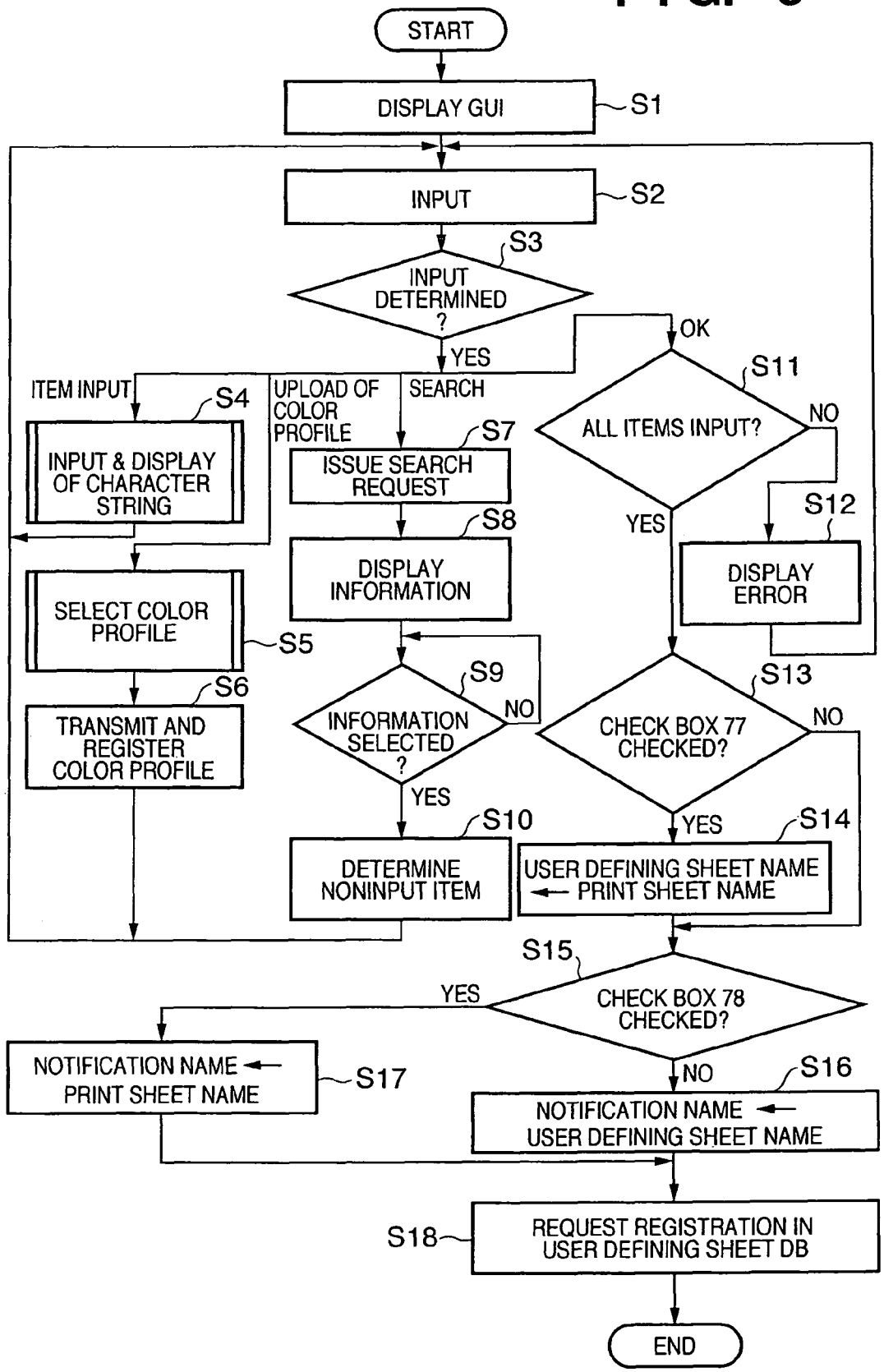
FIG. 8 is a flowchart showing a user defining sheet data registration process in a client terminal.

An outline of the user defining sheet setting application has been described. Detailed process procedures of this application will be explained with reference to the flowchart shown in FIG. 8.

In step S1, the user defining sheet setting application displays the GUI window in FIG. 7. In step S2, the process waits for a designation input from an operator (administrator). In step S3, the user defining sheet-setting application determines the designation input.

If the user defining sheet setting application determines that the designation input is an input from one of the columns 71, 72, and 74, the process advances to step S4 to display input characters or input numerical characters in a corresponding column.

If the user defining sheet setting application determines that the designation input is clicking of the button 73, the process advances to step S5 to display a dialog box (not shown) and prompts the operator to select a color profile to be uploaded. The process advances to step S6 to transmit the color profile to the control apparatus 2000. The control apparatus 2000 stores the color profile in a predetermined folder of the storage device 201.

If the user defining sheet setting application determines that the operator clicks the search button 75, the process advances to step S7 to issue a search request command to the control apparatus 2000 using data input in the area 74 as a search key. The control apparatus 2000 sends back the fields (see FIG. 5) of matching print sheet information. The user defining sheet setting application displays the information in the area 76 to allow the operator to select it (step S8).

If the user defining sheet setting application detects that the operator selects desired print sheet information from the information displayed in the area 76 (step S9), it inputs and displays data of the selected print sheet information in blank input columns in the area 74 (step S10).

If the user defining sheet setting application determines that the operator clicks an OK button 79, the process advances to step S11 to determine whether he inputs all the items. If a noninput item remains, the user defining sheet setting application displays an error in step S12, and the process returns to step S2.

If the user defining sheet setting application determines that the operator inputs all the items, the process advances to step S13 to determine whether the check box 77 is checked, i.e., whether to set the print sheet name as the user defining sheet name. If the user defining sheet setting application determines that the check box 77 is checked, the print sheet name replaces the character string of the user defining sheet name (column 71).

The process advances to step S15 to determine whether the check box 78 is checked, i.e., which of the print sheet name and user defining sheet name is used as the name of a print sheet to be notified by a recovery message. If the check box 78 is not checked, the process advances to step S16 to set the user defining sheet name as the notification name. If the user defining sheet setting application determines that the check box 78 is checked, the process advances to step S17 to set the print sheet name as the notification name.

The process advances to step S18 to transmit the setting information together with a registration command to the control apparatus 2000 and register the setting information in the user defining sheet DB 201a.

As described above, each client terminal on the network 3000 recognizes the control apparatus 2000 as a network printer. That is, a printer driver for recognizing the control apparatus 2000 as a network printer is installed in each client terminal. Each client issues a print job as follows.

Figure 9:
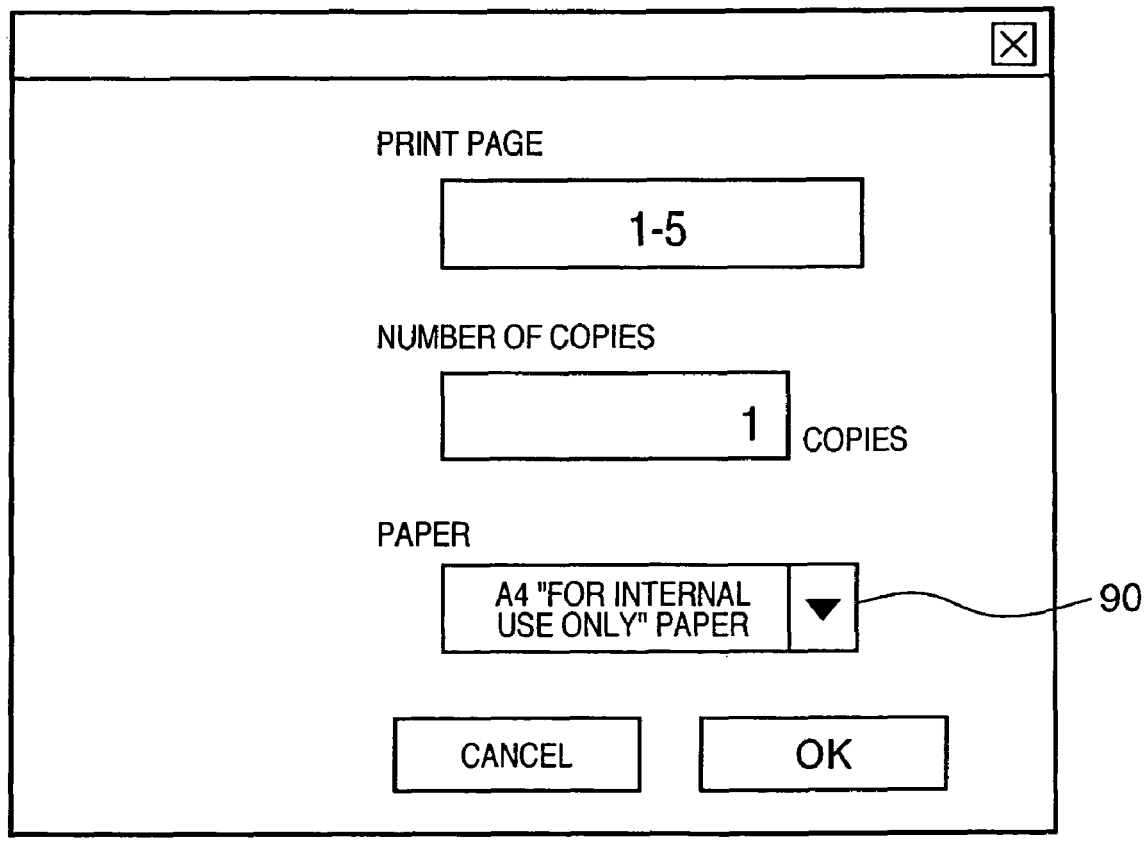
FIG. 9 is a view showing an example of a GUI in a printing process by the client terminal.

The user (who need not be an administrator) of the client terminal executes a proper application program to designate printing. In response to this, the printer driver installed in the client terminal starts up to display a printing setup window. FIG. 9 shows an example of the setup window. The printer driver displays a window made up of a page range subjected to printing, a column for inputting the number of copies, and a combo box 90 for selecting a print sheet. For descriptive convenience, FIG. 9 shows these three conditions.

When the user clicks the right end of the combo box 90 for selecting a print sheet, the printer driver requests the control apparatus 2000 to acquire information on the user defining sheet DB 201a. The printer driver presents a user defining sheet name list in the acquired information to prompt the operator to select a user defining sheet name. The user finally clicks the OK button, and the printer driver generates print PDL print job data under the set conditions and transmits it to the control apparatus 2000.

As described above, the control apparatus 2000 holds the user defining sheet DB 201a, and each client on the network can perform a printing process using the image processing function (color profile in the embodiment) of the control apparatus 2000. If an error requiring recovery occurs in the color copying apparatus 1000, the color copying apparatus 1000 transmits a recovery request message via the network interface 102. For example, when print sheets in the sheet cassette 335 run short, the message is "Recycled sheets run short. Please load sheets." in accordance with FIG. 4.

In the arrangement of FIG. 1, the control apparatus 2000 receives the recovery request message. The control unit 203 of the control apparatus 2000 in the embodiment searches the field 62 of the user defining sheet DB 201a in the storage device 201 using the print sheet name (in this case, "recycled sheets") contained in the recovery request message as a key. When the user defining sheet DB 201a stores and holds data in FIG. 6, the first record (record indicated by an arrow in FIG. 6) matches the print sheet name in the message, and the control unit 203 acquires information in the notification name field 64 of the record. In FIG. 6, the notification name field 64 represents "use the user defining sheet name", and the message is rewritten into "A4 'for internal use only' sheets run short. Please load sheets." The control unit 203 transmits the rewritten message to the client terminal which has issued the current print job, and causes it to display the message. FIG. 10A shows an example of an error message displayed on the client terminal in this case. In other words, the control unit 203 transmits, to the client terminal which has issued the current job, a message using not the sheet name registered in the color copying apparatus 1000 but the sheet name registered in the control apparatus 2000.

When the control apparatus 2000 receives a recovery request message "Thick sheets run short. Please load sheets." from the color copying apparatus 1000, the print sheet name is used in accordance with the user defining sheet DB in FIG. 6. The display screen of the client terminal displays a message in FIG. 10B. The printer driver installed in the client terminal performs the error message display process.

Figure 11:
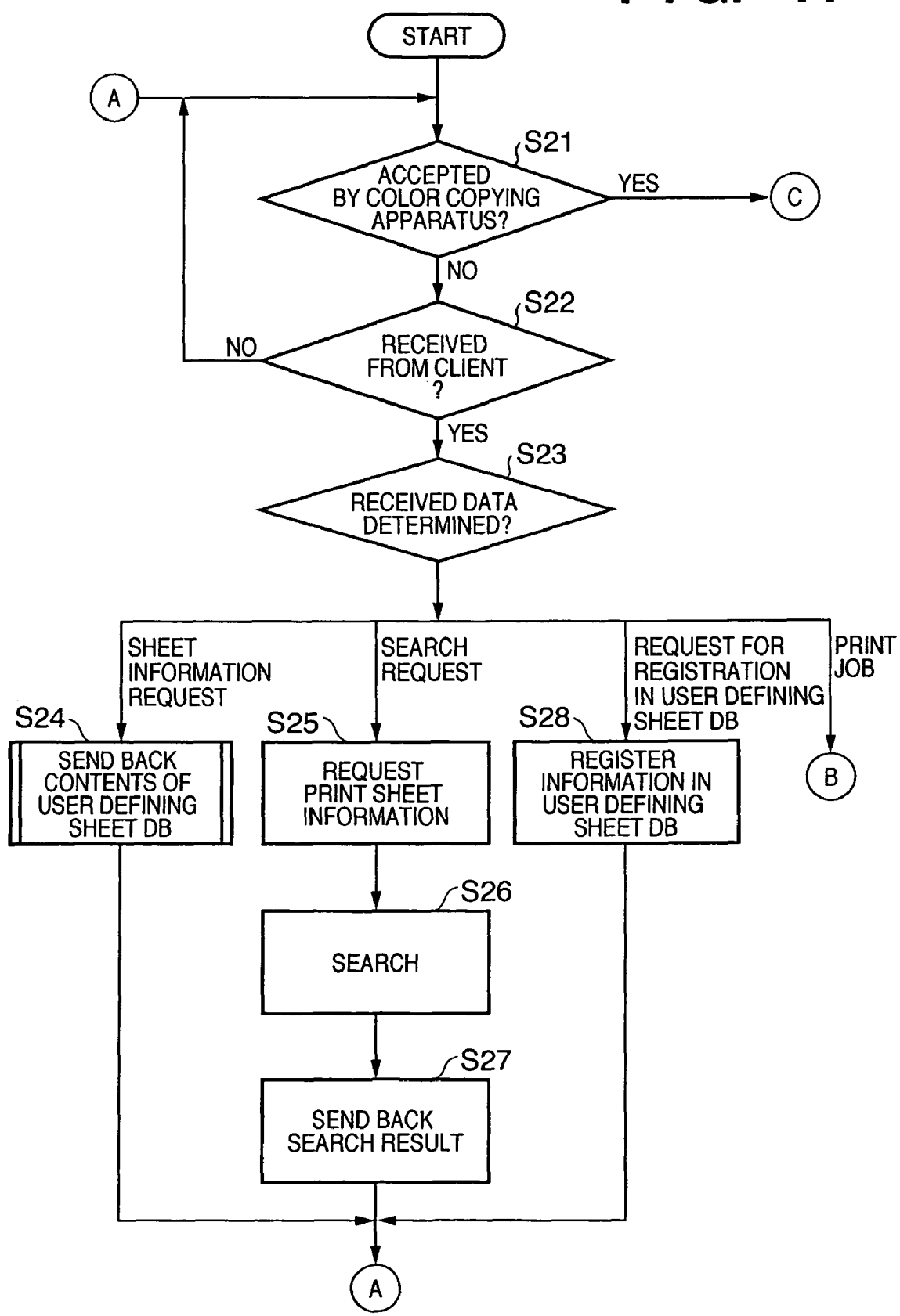
FIG. 11 is a flowchart showing process procedures executed by the control apparatus in the embodiment.

To achieve the above process, the process procedures of the control apparatus 2000 in the embodiment will be explained with reference to the flowcharts of FIGS. 11 to 13. The ROM in the control unit 203 stores programs corresponding to the flowcharts.

In steps S21 and S22, the control apparatus 2000 determines whether it has received any data from either the network interface 202 or 207.

If the control apparatus 2000 determines that it has received data from the network interface 202, i.e., a client terminal on the network 3000, the process advances to step S23 to determine the received data.

If the control apparatus 2000 determines that the received data is a user defining sheet information request, i.e., that the user designates the combo box 90 in FIG. 9 and inquires a sheet type in printing by the client terminal, the process advances to step S24. In step S24, the control apparatus 2000 transmits the contents of the user defining sheet DB 201*a* to the requesting client terminal.

If the control apparatus 2000 determines that the received data is a search request, i.e., a request message generated by clicking the search button 75 in FIG. 7 by the administrator, the process advances to step S25. In step S25, the control apparatus 2000 issues a request to inquire a sheet type of the color copying apparatus 1000. In response to this, the color copying apparatus 1000 transfers data in the print sheet DB 108*a*. In step S26, the control apparatus 2000 searches the data of the print sheet DB 108*a* for data which coincides with item data (not limited to one item data) contained in the search request message from the client terminal. In step S27, the control apparatus 2000 transmits matching print sheet information (information in the fields shown in FIG. 5) to the requesting client terminal.

If the control apparatus 2000 determines that the received data is a registration request to the user defining sheet DB 201*a*, the process advances to step S28 to register, in the user defining sheet DB 201*a*, a user defining sheet name, print sheet name, color profile, and the like (see FIG. 6) accessory to the received registration request command.

Figure 12:
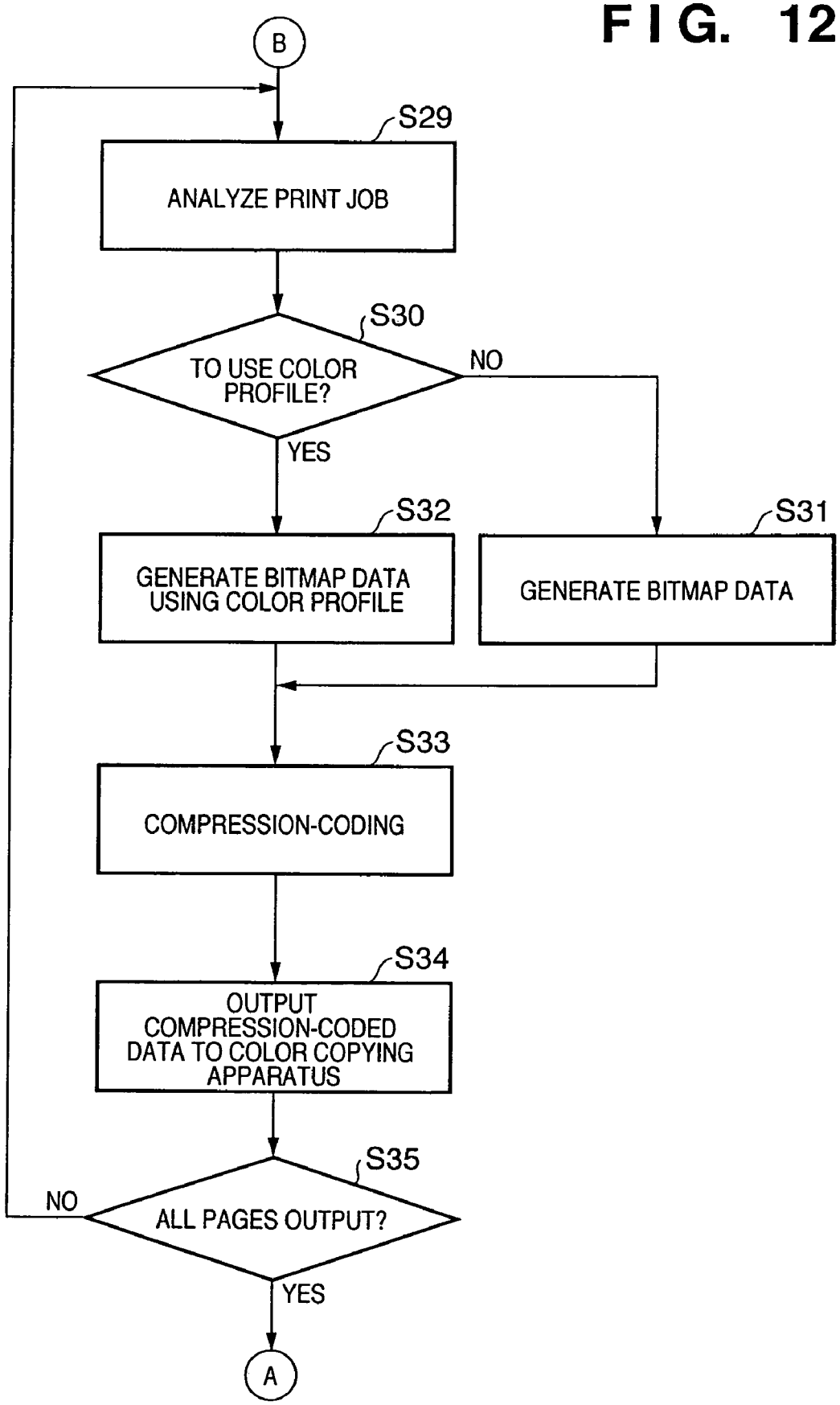
FIG. 12 is a flowchart showing process procedures executed by the control apparatus in the embodiment.
Figure 13:
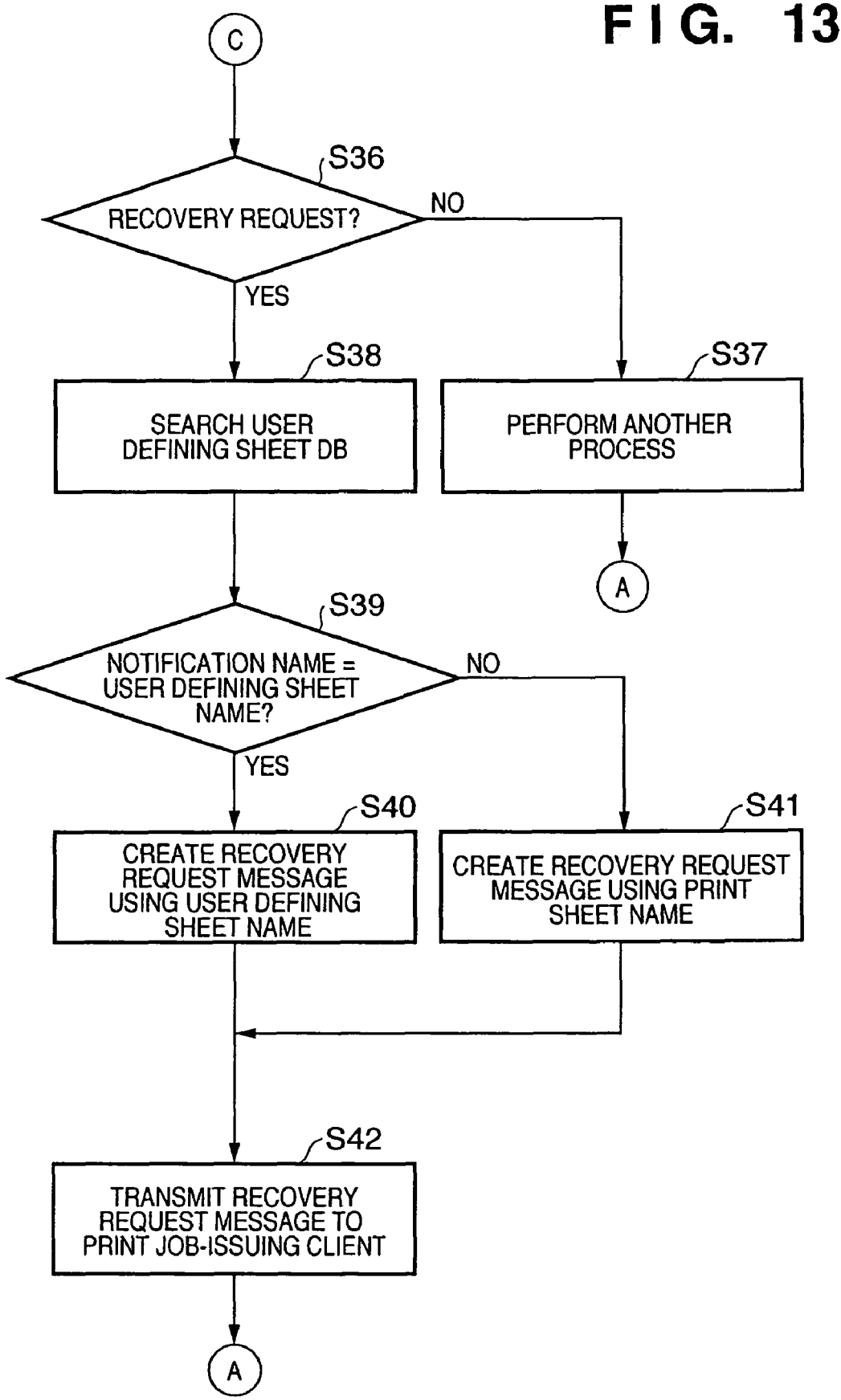
FIG. 13 is a flowchart showing process procedures executed by the control apparatus in the embodiment.

If the control apparatus 2000 determines that it has received a print job, the process advances to step S29 (FIG. 12). In step S29, the control apparatus 2000 interprets the received print job. At this time, the control apparatus 2000 temporarily stores, in the storage device 201, information (e.g., an IP address) for identifying the print job-issuing client terminal. In step S30, the control apparatus 2000 determines whether the print job contains a designation instruction to use a color profile. If the control apparatus 2000 determines that the print job contains the designation instruction to use a color profile, the process advances to step S32. In step S32, the control apparatus 2000 reads out the color profile specified by the designation instruction from the storage device 201, and uses the image processing unit 204 to generate bitmap data of the print color components Y, M, C, and K. If the print job does not contain the designation instruction to use a color profile, the process advances to step S31. In step S31, the control apparatus 2000 generates bitmap data of the print color components without any color profile. For a print job of a general text-only monochrome document, the control apparatus 2000 generates bitmap data of only the K component.

The process advances to step S33 to compression-code the generated 1-page output image data. In step S34, the control apparatus 2000 transmits the compression-coded data to the color copying apparatus 1000 via the video interface 206. At this time, the control apparatus 2000 also transmits information representing which sheet cassette is to be used.

How to transmit information representing which cassette is to be used will be explained. The control apparatus 2000 converts a user defining sheet name designated by a job input from a client terminal into a corresponding print sheet name by searching data in FIG. 6. The control apparatus 2000 selects a cassette for use on the basis of the information in FIG. 4 acquired in advance from the color copying apparatus 1000, and the converted print sheet name. The control apparatus 2000 can transmit information representing the cassette selected for use.

The control apparatus 2000 converts a user defining sheet name designated by a job input from a client terminal into a corresponding print sheet name by searching data in FIG. 6. At this time, it is also possible to transmit the converted print sheet name to the color copying apparatus 1000 and select a cassette by the color copying apparatus 1000 on the basis of the print sheet name.

The color copying apparatus 1000 receives compression-coded image data via the extension interface 103. The control unit 101 of the color copying apparatus 1000 temporarily stores the received compression-coded output image data in the storage device 108, and causes the image compression/decompression unit 104 to decompress (decode) it at a timing suitable for the printing process of the printer engine 151. The control unit 101 outputs the decompressed bitmap data to the printer engine 151 to print.

After step S33, the process advances to step S35 to determine whether transfer of output image data of all pages based on the received print job to the color copying apparatus 1000 is complete. If NO in step S35, the control apparatus 2000 repeats the processes in step S29 and subsequent steps.

The process of the control apparatus 2000 for data received via the network interface 202 according to the embodiment has been described. A process when the control apparatus 2000 receives data via the network interface 207, i.e., from the color copying apparatus 1000 will be described with reference to the flowchart of FIG. 13. This process starts if YES in step S21 of FIG. 11.

In step S36, the control apparatus 2000 determines whether data received from the color copying apparatus 1000 is a recovery request message. The recovery request message notifies the control apparatus 2000 of generation of an error such as the absence of print sheets or a jam of a print sheet in the apparatus, as described above. If the control apparatus 2000 determines that the received data is a message other than the recovery request message, the process advances to step S37 to perform a corresponding process.

If the control apparatus 2000 determines that it has received the recovery request message, the process advances to step S38 to search the user defining sheet DB 201*a* using a print sheet name described in the recovery request message as a key. Then, the process advances to step S39 to determine, on the basis of the field 64 (see FIG. 6) of the record obtained by search, the user defining sheet name or print sheet name of which the client terminal is to be notified as a sheet name. If the control apparatus 2000 determines that the user defining sheet name is to be notified, the process advances to step S40 to acquire the user defining sheet name from the field 61 (see FIG. 6) and generate a recovery message. If the control apparatus 2000 determines that the print sheet name is to be used, it acquires the print sheet name from the field 62 in step S41 to generate a recovery message.

The process advances to step S42 to transmit the generated recovery message to the client terminal which has issued the print job stored in the storage device 201. At this time, the display unit such as the panel of the control apparatus 2000 may display the generated recovery message. The control apparatus 2000 may also transmit the generated recovery message to the color copying apparatus 1000 to display the generated recovery message on the color copying apparatus 1000. It is also possible to check a message displayed on the control apparatus 2000 from the client terminal via a remote UI. The control apparatus 2000 may also transmit the recovery message even to a specific client terminal set in advance.

As described; above, the embodiment can provide advanced printing requested by a user by interposing, between a printing apparatus and a network, a control apparatus which implements an image process not supported by the printing apparatus such as a network-connectable color copying apparatus. Since the administrator can freely set a user defining sheet name in the control apparatus, he need not have any knowledge about a print sheet name and the like. When the printing apparatus issues a recovery request message about a print sheet, the control apparatus can set, in accordance with the user operation form, which of the print sheet name and user defining sheet name is to be used to transmit the recovery message to the client terminal.

In the embodiment, the client terminal executes processes corresponding to the check boxes 77 and 78 in FIG. 7. Alternatively, the client terminal may transmit checked/unchecked state information of the check boxes 77 and 78 to the control apparatus 2000. In this case, the control unit 203 of the control apparatus 2000 executes processes corresponding to steps S15 to S17 in FIG. 8.

SECOND EMBODIMENT

In the above embodiment, a subset of print sheet data is acquired and registered when registering user defining sheet data in the user defining sheet database. It is also possible to register user defining sheet data from print sheet data of sheets stacked in the printer in advance.

In this case, desired sheets to be registered are set in advance in a desired sheet cassette of the color copying apparatus, and the printer registers correct print sheet data. In this state, user defining sheet data is registered.

FIG. 14 shows an example of a GUI associated with the registration of user defining sheet data. The GUI in FIG. 14 is identical to that in FIG. 7 except for an additional combo box 1400 for setting a sheet tray. A control apparatus 2000 stores and holds, in a storage device 201, a database (database storing hardware configuration information of respective models) of printing apparatuses (including a color copying apparatus) connectable to a network interface 207. Information for specifying a color copying apparatus 1000 is set in the control apparatus 2000. The control apparatus 2000 notifies a client terminal, which displays the GUI of FIG. 14, of the names of sheet cassettes provided by a connected printing apparatus. The user can set one of the sheet cassettes from the combo box 1400 shown in FIG. 14. Along with this, a field for storing a sheet cassette name is added to the user defining sheet DB in the control apparatus 2000.

The control apparatus 2000 can transmit a recovery message such as "Sheets (user defining sheet name or print sheet name) stored in sheet cassette 1 run short. Please load sheets."

The embodiments have exemplified a multifunctional peripheral (e.g., color copying apparatus) as an apparatus connected to the control apparatus 2000, but the present invention is also applicable to a single printing apparatus having only the printing function. The embodiments have exemplified the absence of sheets, a jam, and the like as the recovery message, but the present invention is not limited to them as far as the error message pertains to sheets. As an example of an image process by the control apparatus 2000, the embodiments have described an example of generating bitmap data using a color profile. However, a feature of the present invention is to add a new function till generation of output image data finally used by a printing apparatus. Thus, the present invention is not limited to the image process based on the use of the color profile.

In the embodiments, the control apparatus 2000 and printing apparatus (color copying apparatus 1000) connect to each other not only by a network interface but also by a high-speed transfer bus of another system (video interface: extension interface). When the transfer rate of the network interface between the two apparatuses is sufficiently high, bus connection of another system is unnecessary. However, the maximum rate of the current Ethernet is about 100 Mbps, so the control apparatus 2000 and printing apparatus are desirably connected by a dedicated bus, as described in the embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-332059, filed Nov. 16, 2005, which is hereby incorporated by reference herein in its entirety.

What is claimed is:

1. A control apparatus which extends a function of an image forming apparatus, comprising:

first communication means for communicating with a network connected to a client terminal which issues a print job;

second communication means for communicating with the image forming apparatus;

image processing means for generating output image data on the basis of extended-function designation information described in the print job received by said first communication means;

first output means for outputting the generated output image data to the image forming apparatus via said second communication means;

storage means for storing a user defining sheet database which stores, for each print medium type printable by the image forming apparatus, user defining sheet name information independent of a print sheet name in a database of the image forming apparatus, and information representing which of print sheet name information in a message and user defining sheet name information is to be used when receiving a print medium recovery request message from the image forming apparatus; and second output means for, upon receiving the recovery request message via said second communication means, referring to said storage means to determine which of user defining sheet name information and the print sheet name information is to be used, regenerating the recovery request message, and outputting the regenerated recovery request message.

2. The apparatus according to claim 1, wherein said second output means outputs the recovery request message to the client terminal via said first communication means.

3. The apparatus according to claim 1, wherein said second output means outputs the recovery request message to a display unit of the control apparatus.

4. The apparatus according to claim 1, wherein said second output means outputs the recovery request message to a color printer apparatus.

5. The apparatus according to claim 1, wherein said second communication means includes a network interface for communicating a status with the image forming apparatus, and an independent transfer bus interface for transferring output image data.

6. The apparatus according to claim 1, wherein said storage means stores information on a user defining sheet in the user defining sheet data in accordance with a request from the network.

7. A method of controlling a control apparatus which has first communication means for communicating with a network connected to a client terminal that issues a print job, and second communication means for communicating with an image forming apparatus whose function is to be extended, and extends the function of the image forming apparatus, comprising:

an image processing step of generating output image data on the basis of extended-function designation information described in the print job received by the first communication means;

a first output step of outputting the generated output image data to the image forming apparatus via the second communication means;

a storage step of storing a user defining sheet database which stores, for each print medium type printable by the image forming apparatus, user defining sheet name information independent of a print sheet name in a database of the image forming apparatus, and information representing which of print sheet name information in a message and user defining sheet name information is to be used when receiving a print medium recovery request message from the image forming apparatus; and a second output step of, upon receiving the recovery request message via the second communication means, referring to the user defining sheet database to determine which of the user defining sheet name information and the print sheet name information is to be used, regenerating the recovery request message, and outputting the regenerated recovery request message.

8. A network printing system formed from at least one client terminal which connects to a network and issues a print job, an image forming apparatus, and a control apparatus which extends a function of the image forming apparatus, wherein the control apparatus comprises first communication means for communicating with a network connected to a client terminal which issues a print job, second communication means for communicating with the image forming apparatus, image processing means for generating output image data on the basis of extended-function designation information described in the print job received by said first communication means, first output means for outputting the generated output image data to the image forming apparatus via said second communication means, storage means for storing a user defining sheet database which stores, for each print medium type printable by the image forming apparatus, user defining sheet name information independent of a print sheet name in a database of the image forming apparatus, and information representing which of print sheet name information in a message and user defining sheet name information is to be used when receiving a print medium recovery request message from the image forming apparatus, first transmission means for, upon receiving a print sheet information search request from a client terminal via said first communication means, acquiring print sheet information from the image forming apparatus via said second communication means, and transmitting print sheet information matching the search request to the requesting client terminal, and second output means for, upon receiving the recovery request message via said second communication means, referring to said storage means to determine which of user defining sheet name information and print sheet name information is to be used, regenerating the recovery request message, and outputting the regenerated recovery request message, each client apparatus comprises print job issuing means for recognizing the control apparatus as an image forming apparatus, and transmitting a print job to said first communication means of the control apparatus, and said at least one client terminal comprises display means for displaying a setup window having a plurality of input items in order to register user defining sheet information in said storage means of the control apparatus, search request means for, when inputting a desired input item and inputting search designation, transmitting a search request containing information on the input item to said first communication means of the control apparatus, selection means for selecting one of pieces of received print sheet information after transmitting the search request from said search request means, setting means for setting a noninput item on the basis of the selected print sheet information, and registration request means for requesting said storage means of the control apparatus to register information set through the setup window.

9. A non-transitory computer-readable storage medium storing a computer-executable program which causes a computer to execute a method of controlling a control apparatus which has first communication means for communicating with a network connected to a client terminal that issues a print job, and second communication means for communicating with an image forming apparatus whose function is to be extended, and extends the function of the image forming apparatus, the method comprising:

an image processing step of generating output image data on the basis of extended-function designation information described in the print job received by the first communication means;

a first output step of outputting the generated output image data to the image forming apparatus via the second communication means;

a storage step of storing a user defining sheet database which stores, for each print medium type printable by the image forming apparatus, user defining sheet name information independent of a print sheet name in a database of the image forming apparatus, and information representing which of print sheet name information in a message and user defining sheet name information is to be used when receiving a print medium recovery request message from the image forming apparatus; and a second output step of, upon receiving the recovery request message via the second communication means, referring to the user defining sheet database to determine which of the user defining sheet name information and the print sheet name information is to be used, regenerating the recovery request message, and outputting the regenerated recovery request message.

* * * * *